United States Patent Office 3,690,863
Patented Sept. 12, 1972

---

3,690,863
ESTERS OF 3-(CARBOXYAMINO)-AND 3-(THIO-CARBOXYAMINO)-2-SUBSTITUTED CROTON-AMIDES AND THEIR USE AS HERBICIDES
Peter Gerike, Wilmington, Del., assignor to E. I. du Pont de Nemours and Company, Wilmington, Del.
No Drawing. Filed Apr. 19, 1968, Ser. No. 722,535
Int. Cl. A01n 9/20
U.S. Cl. 71—111         6 Claims

ABSTRACT OF THE DISCLOSURE

This invention relates to the use of esters of [2-substituted-1-methyl-2-(substituted carbamoyl)vinyl]carbamic acids, 2-substituted-3-(3-substituted ureido)-N-substituted crotonamides, and esters of [2-substituted-3-(alkoxy or phenoxycarbonylamino)crotonoyl]carbamic acids as herbicides and new compounds and herbicidal compositions.

SUMMARY OF THE INVENTION

This invention is directed to compositions and methods employing, as an active herbicidal ingredient, a compound of the formula

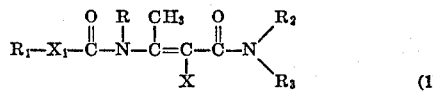

where

X is chlorine, bromine, fluorine
$X_1$ is oxygen, sulfur, imino
R is hydrogen, $C_1$–$C_3$ alkyl, or allyl
$R_1$ is $C_1$–$C_4$ alkyl, phenyl, substituted phenyl
$R_2$ is $C_1$–$C_8$ alkyl, $C_2$–$C_8$ alkenyl, $C_2$–$C_8$ alkoyl, $C_3$–$C_{10}$ cycloalkyl, $C_5$–$C_{10}$ cycloalkenyl, phenyl, benzyl, substituted phenyl and benzyl, cycloalkylmethyl, $C_1$–$C_4$ alkoxycarbonyl, or phenoxycarbonyl
$R_3$ is hydrogen, methyl, and ethyl with the proviso that $R_2$ and $R_3$ can be taken together to form a piperidino, pyrrolidino, or hexamethylenimino ring. Preferred for use according to this invention because they are effective as herbicides at lower rates of application are compounds of the formula

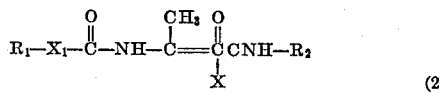

where

X is chlorine or bromine
$R_1$ is methyl, ethyl, phenyl, or substituted phenyl, and
$R_2$ is phenyl or benzyl or substituted phenyl or benzyl, $C_1$–$C_4$ alkoxycarbonyl, or phenoxycarbonyl,
$X_1$ is oxygen, sulfur, imino.

The compounds may be the cis- or trans-isomer or a mixture of both. In the foregoing list, the terms cycloalkyl and cycloalkenyl will include: cyclohexyl; cyclohexenyl; cyclopentyl; cyclopentenyl; norbornyl; norbornenyl; bicyclo(2,2,2)octyl; bicyclo(2,2,2)octenyl; cyclopropyl; cyclobutyl; hexahydroindanyl; tetrahydroindanyl and hexahydroindenyl.

Similarly, the terms "substituted phenyl" and "substituted benzyl" embrace radicals such as: o-biphenyl; pyridyl; chlorophenyl; bromophenyl; alkoxyphenyl; dichlorophenyl; dibromophenyl; fluorophenyl; trichlorophenyl; alkylphenyl of 7 through 11 carbon atoms; dialkylphenyl of 8 through 12 carbon atoms; nitrochlorophenyl; nitrophenyl; dichloronitrophenyl; chloroalkoxyphenyl of 7 through 11 carbon atoms; trifluoromethylphenyl; tetrahydronaphthyl; indenyl; chlorobenzyl; dichlorobenzyl; nitrobenzyl; alkoxybenzyl of 8 through 11 carbon atoms.

Especially preferred for use because of their herbicidal effectiveness are:

carbamic acid, [2-chloro-1-methyl-2-(phenylcarbamoyl)vinyl]-, ethyl ester, mixed cis- and trans-
carbamic acid, trans-[2-chloro-1-methyl-2-(phenylcarbamoyl)vinyl]-, ethyl ester
carbamic acid, [2-bromo-1-methyl-2-(phenylcarbamoyl)vinyl]-, ethyl ester
carbamic acid, [2-chloro-1-methyl-2-(o-fluorophenylcarbamoyl)vinyl]-, methyl ester
carbamic acid, [2-bromo-1-methyl-2-(m-fluorophenylcarbamoyl)vinyl]-, propyl ester
carbamic acid, [2-bromo-1-methyl-2-(o-fluorophenylcarbamoyl)vinyl]-, butyl ester
carbamic acid, [2-chloro-1-methyl-2-(m-fluorophenylcarbamoyl)vinyl]-, ethyl ester
crotonanilide, 2-chloro-3-(3-phenylureido)-,
crotonanilide, 2-bromo-3-(3-phenylureido)-,
carbamic acid, [2-chloro-3-(ethoxycarbonylamino)crotonoyl]-, ethyl ester
carbamic acid, [2-bromo-3-(phenoxycarbonylamino)crotonoyl]-, ethyl ester

PREPARATION OF THE COMPOUNDS

The compounds represented by the structure of Formulae 1 or 2 are prepared by the following reaction sequence:

(3)

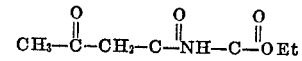

This condensation of primary and secondary amines with diketene is well known and described in the literature. For more details see, e.g. J. W. Williams, J. A. Krynitsky, Org. Syn., Coll. vol. III, p. 10.

The condensation of diketene with carbamic acid esters such as (4)

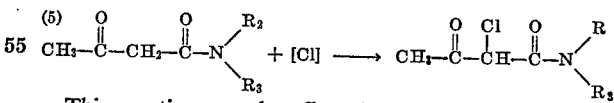

has also been reported R. K. Ralph et al., J. Chem. Soc., 1177 (1959).

The N-substituted or N,N-disubstiuted acetoacetamide obtained according to Equations 3 or 4 may then be chlorinated:

(5)

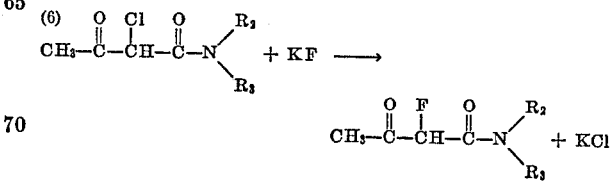

This reaction may be effected with elemental chlorine in the presence of urea according to Neth. 67.02534; with sodium hypochloride according to British Patent No. 1,038,799; or with sulfuryl chloride.

If X in structure (1) is fluorine, the intermediate N-substituted or N,N-disubstituted 2-fluoroacetoacetamide is prepared by the exchange reaction indicated in Equation 6.

(6)

$$CH_3-\overset{O}{\overset{\|}{C}}-\overset{Cl}{\overset{|}{CH}}-\overset{O}{\overset{\|}{C}}-N\overset{R_2}{\underset{R_3}{\diagdown}} + KF \longrightarrow$$

$$CH_3-\overset{O}{\overset{\|}{C}}-\overset{F}{\overset{|}{CH}}-\overset{O}{\overset{\|}{C}}-N\overset{R_2}{\underset{R_3}{\diagdown}} + KCl$$

Similar reactions have been described, see, e.g. P. Tarrant et al., J. Am. Chem. Soc., 70, 2653 (1948).

The N-substituted or N,N-disubstituted 2 - haloacetoacetamide from (5) or (6) is now condensed with a carbamate ($X_1=O$), or a thiolcarbamate ($X_1=S$), or a urea ($X_1=NH$) if $X=F$ or A according to the equation

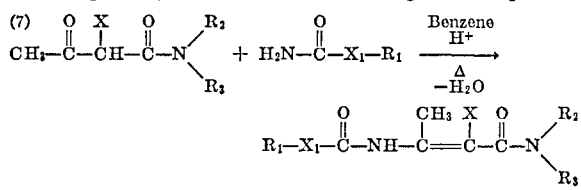

in the following manner:

Equimolar amounts of appropriately substituted 2-haloacetoacetamide and carbamate ($X_1=O$), or thiolcarbamate ($X_1=S$), or a urea ($X_1=NH$) if $X=F$ or A are dissolved or dispersed in a suitable organic solvent, such as benzene. A small amount of a strongly acidic catalyst such as sulfuric, phosphoric, or p-toluenesulfonic acid is added, and the reaction mixture heated under reflux for from 4 to 16 hours with continuous removal of water by means of a Dean-Stark trap. The reaction mixture is then cooled to room temperature and a suitable base such as triethylamine added in order to neutralize the acid. The solvent is evaporated. The resulting product is essentially pure but may be recrystallized from a suitable solvent such as ethanol or ethyl acetate. Often the subject compounds do not melt sharply; this is due to the presence of both geometric isomers.

In an alternative route, the N-substituted or N,N-disubstituted acetoacetamide from (3) or (4) is first condensed with a carbamate ($X_1=O$), a thiolcarbamate ($X_1=S$), or a urea ($X_1=NH$) and then the resulting product is halogenated.

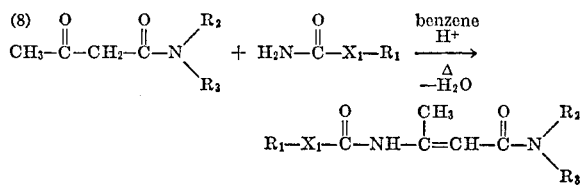

The reaction is performed as described under Equation 7. Furthermore, these compounds (except where $X_1=NH_1$ and $R_2 \neq H$) are reported in U.S. Patent No. 3,321,464. The subsequent halogenation is performed as follows:

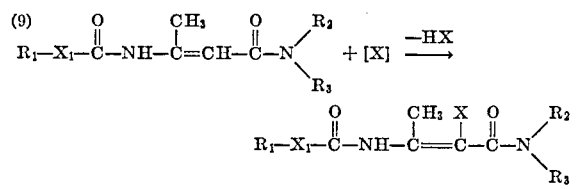

The compound, obtained according to (8), is dissolved or dispersed in a suitable solvent such as glacial acetic acid, an aromatic hydrocarbon such as benzene, toluene, xylene, and the like, or a chlorinated hydrocarbon such as methylene chloride, chloroform, carbon tetrachloride, and the like. The solution or suspension is stirred and cooled in an ice-water bath. An equimolar amount of sulfuryl chloride, diluted with the solvent used to dissolve or suspend the reactant, is added dropwise over a period of about 1 hour. The resulting product solution is washed with water and dried over a suitable drying agent such as anhydrous sodium or magnesium sulfate. The mixture is filtered and the solvent evaporated. The product is essentially pure but may be recrystallized from a suitable solvent such as ethanol, or ethyl acetate.

Brominations are effected as follows:

The compound, obtained according to (8) is dissolved in a suitable solvent such as chloroform, carbon tetrachloride, or the like. An equimolar amount of N-bromosuccinimide and a catalytic amount of benzoylperoxide are added and the mixture stirred in the sunlight until all the N-bromosuccinimide is consumed. The solid is filtered and the solvent evaporated to yield essentially pure product. The product may be recrystallized from a suitable solvent. Again, the compounds may not give a sharp melting point because of the presence of both possible geometrical isomers.

Herbicidal compositions

Herbicidal compositions of the present invention can be prepared by admixing at least one of the compounds of this invention with pest control adjuvants or modifiers to provide compositions in the form of dusts, granules, pellets, water-dispersible and water-soluble powders, high-strength concentrates, aqueous dispersions or emulsions and solutions or dispersions in organic liquids.

The compounds of this invention can be used with a carrier or diluent agent such as a finely divided solid, an organic liquid, water, a wetting agent, a dispersing agent, an emulsifying agent, or any suitable combination of these.

Compositions of the invention, especially liquids and wettable powders, may contain as a conditioning agent one or more surface-active agents, sometimes called surfactants, in amounts sufficient to render a given composition containing the compounds of this invention readily dispersible in water or in oil.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set forth, for example, in "Detergents and Emulsifiers" 1967 Annual by John W. McCutcheon, Inc.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions have a greater herbicidal effectiveness than can be expected from a consideration of the activity of the components used separately. When used at higher rates it is preferred that the surfactant be present in the range of one-fifth to five parts surfactant for each one part of active agent.

(A) Wettable powders.—Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the compounds of this invention are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers" 1967 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, sulfated or sulfonated long chain amines or amides, long chain acid esters of sodium isothionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, lignin sulfonates, polymeric alkylnaphthalene sulfonates, sodium naphthalenesulfonate, polymethylene bisnaphthalenesulfonate, and sodium-N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 1.0 percent by weight of the composition, both replacing equivalent amounts of the inert extender.

(B) High strength compositions, aqueous suspension and water-soluble concentrates.—High-strength compositions generally consist of 90 to 99.5% active ingredient and 0.5 to 10% of a liquid or solid surfactant such as those described by McCutcheon in "Detergents and Emulsifiers" 1967 Annual. Such high-strength compositions can often be used in a manner similar to the wettable powders but they are also suitable for further formulation. Small amounts (up to about 5%) of inert diluents such as synthetic fine silicas or silicates may also be present.

The aqueous suspension concentrates are prepared by mixing together and sandgrinding an aqueous slurry of water-insoluble active ingredient in the presence of dispersing agents. Thus there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 50% of active ingredient, from 45 to 70% water with the remainder made up of surfactants, corrosion inhibitors, and suspending agents.

Suspensions in organic liquids can be prepared in a similar manner such as by replacing the water with mineral oil.

Water-soluble concentrates consist of certain of the compounds of this invention (where $R_2$ is hydrogen and $R_3$ is alkoxycarbonyl or phenoxycarbonyl) in admixture with strong bases such as sodium metasilicate, sodium hydroxide, potassium carbonate or potassium hydroxide. When added to water, such compositions provide homogeneous solutions.

(C) Dusts.—Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid adsorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation, some liquid non-ionic agents are also suitable in the dust formulations.

Preferred inert solid extenders for the dusts of this invention are micaceous talcs, pyrophyllite, dense kaolin clays, sericite tobacco dust and ground calcium phosphate rock such as that known as "Phosphodust," a trademark of the American Agricultural Chemical Company.

Preferred grinding aids are attapulgite clay, diatomaceous earth, silica, synthetic fine silica and synthetic calcium and magnesium silicates. Preferred wetting agents are those previously described under wettable power formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 2 to 30 weight percent active material, 5 to 50 weight percent abrsorptive filler, 0 to 1.0 weight percent wetting agent, and about 20 to 93 weight percent dense, free-flowing dust diluent, as these terms are used herein. Such dust formations can contain, in addition, minor amounts of dispersants, corrosion inhibitors, and anti-foam agents, derived from the wettable powders used to make the dusts.

(D) Emulsifiable oils.—Emulsifiable oils are usually solutions of active material in water-immiscible solvents together with a surfactant.

For the compounds of this invention, emulsifiable oils can be made by mixing the active ingredient with a solvent and surfactant. Suitable solvents for the compounds of this invention are aromatic hydrocarbons including many weed oils, chlorinated solvents, and water-immiscible ethers, esters, or ketones. Suitable surfactants are those anionic or non-ionic agents known to the art as emulsifying agents. Such compounds can be found listed in "Detergents and Emulsifiers" 1967 Annual by John W. McCutcheon, Inc.

Emulsifying agents most suitable for the emulsifiable oil compositions of this invention are long-chain alcohol or mercaptan polyethoxy alcohols, alkylphenol polyethoxy alcohols, sorbitan fatty acid esters, polyoxyethylene ethers with sorbitan fatty acid esters, polyethylene glycol esters with fatty or rosin acids, fatty alkylol amine condensates, calcium and amine salts of fatty alcohol sulfates, oil soluble petroleum sulfonates or, preferably, mixtures of these emulsifying agents. Such emulsifying agents will comprise from about 1 to 10 weight percent of the total composition. As described above, however, up to 5 parts of emulsifying agent for each part of active compound can be used.

Thus, emulsifiable oil compositions of the present invention will consist of from about 15 to 50 weight percent active material, about 40 to 82 weight percent solvent, and about 1 to 10 weight percent emulsifier, as these terms are defined and used above.

In some instances the oil solutions may be intended merely for extension with other oils, such as weed oils. In this instance the emulsifying agents may be omitted and may be replaced by additional solvent.

(E) Granules and pellets.—Granules and pellets are physically stable, particulate compositions containing a compound of this invention which adheres to or is distributed through a basic matrix of a coherent, inert carrier having macroscopic dimensions. In order to aid leaching of the active ingredient from the granule or pellet, a surfactant can be present.

For the compounds of this invention, the inert carrier is preferably of mineral origin, and the surfactant compounds are listed by J. W. McCutcheon in "Detergents and Emulsifiers" 1967 Annual.

Suitable carriers are natural clays, some pyrophyllites and vermiculite. Suitable wetting agents are anionic or non-ionic.

For the granule composiitons of this invention, most suitable carriers are of two types. The first are porous, absorptive, preformed granules, such as preformed and screened granuler attapulgite or heat expanded, granular, screened vermiculite. On either of these, a solution of the active agent can be sprayed and will be absorbed at concentrations up to 25 weight percent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component, but more frequently a concentration of about 10 weight percent is desired for optimum distribution. The granular compositions of this invention are most useful in a size range of 15–60 mesh (1.25–0.25 mm.).

The most suitable wetting agents for the granular compositions of this invention depend upon the type of granule used. When preformed granules are sprayed with active material in liquid form the most suitable wetting agents are non-ionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene glycol esters with fatty or rosin acids, fatty alkylol amide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid non-ionic wetters can still be used, but it is usually preferable to incorporate at the maxing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 2 to 30 weight percent active material, about 0 to 5 weight percent wetting agent, and about 65 to 97 weight percent inert mineral carrier, as these terms are used herein.

Formulation with other herbicides

The crotonamides of this invention can be combined with other known herbicides to give compositions which have advantages over the individual components. Among the known herbicides which can be combined with the crotonamides are:

Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1-diethylurea
3-(p-chlorophenoxyphenyl)-1,1-dimethylurea
N-(3-trifluoromethylphenyl)-N',N'-dimethylurea These ureas can be mixed with the crotonamides in proportions of from 1:4 to 4:1, respectively, the preferred ratio being 1:2 to 2:1.

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2,4-bis-(3-methoxypropylamino)-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis-(ethylamino)-s-triazine
2-methoxy-4-ethylamino-6-isopropylamino-s-triazine
2-chloro-4,6-bis(isopropylamino)-s-triazine These triazines can be mixed with the crotonamides in proportions of from 1:4 to 4:1, respectively, the preferred ratio being 1:2 to 2:1.

Phenols

Dinitro-o-sec-butylphenol and its salts
Pentachlorophenol and its salts

These phenols can be mixed with the crotonamides in proportions of 1:10 to 20:1, respectively, the preferred ratio being 1:5 to 5:1.

Carboxylic acids and derivatives

The following carboxylic acids and derivatives can be mixed with the crotonamides in the listed proportions:

2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-methyl-3,6-dichlorobenzoic acid and its salts
2,3,6-trichlorobenzyloxypropanol
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters 4-(2-methyl-4-chlorophenoxy)butyric acid and its salts and esters Mixed in a 1:16 to 8:1 ratio, preferably a 1:4 to 4:1 ratio.

2,6-dichlorobenzonitrile: Mixed in a 1:4 to 4:1 ratio, preferably a 1:3 to 3:1 ratio.

Trichloroacetic acid and its salts: Mixed in a 1:2 to 25:1 ratio, preferably a 1:1 to 8:1 ratio.

2,2-dichloropropionic acid and its salts: Mixed in a 1:4 to 8:1 ratio, preferably a 1:2 to 4:1 ratio.

N,N-di(n-propyl)thiolcarbamic acid, ethyl ester; N,N-di(n-propyl)thiolcarbamic acid, n-propyl ester; N-ethyl-N-(n-butyl)thiolcarbamic acid, ethyl ester; N-ethyl-N-(n-butyl)thiolcarbamic acid, n-propyl ester: Mixed in a 1:2 to 24:1 ratio, preferably a 1:1 to 12:1 ratio.

N-phenylcarbamic acid, isopropyl ester; N-(m-chlorophenyl)carbamic acid, isopropyl ester; N-(m-chlorophenyl)carbamic acid, 4-chloro-2-butynyl ester: Mixed in a 1:2 to 24:1 ratio, preferably a 1:1 to 12:1 ratio.

2,3,6-trichlorophenylacetic acid and its salts: Mixed in a 1:12 to 8:1 ratio, preferably a 1:4 to 4:1 ratio.

2 - chloro - N,N - diallylacetamide; maleic hydrazide: Mixed in a 1:2 to 10:1 ratio, preferably a 1:1 to 5:1 ratio.

Inorganic and mixed inorganic-organic salts

These salts can be mixed with the crotonamides in the listed proportions.

Calcium propylarsonate, disodium monomethylarsonate, octyl-dodecylammoniummethylarsonate, dimethylarsinic acid: Mixed in a 1:4 to 4:1 ratio, preferably a 1:2 to 2:1 ratio.

Sodium arsenite: Mixed in a 1:5 to 40:1 ratio, preferably a 1:4 to 25:1 ratio.

Lead arsenate, calcium arsenate: Mixed in a 150:1 to 600:1 ratio, preferably a 100:1 to 400:1 ratio.

Sodium tetraborate hydrated, granulated, sodium metaborate, sodium pentaborate, polyborchlorate, unrefined borate ore such as borascu: Mixed in a 3:1 to 120:1 ratio, preferably a 6:1 to 60:1 ratio.

Ammonium thiocyanate: Mixed in a 1:10 to 20:1 ratio, preferably a 1:5 to 5:1 ratio.

Sodium chlorate: Mixed in a 1:1 to 40:1 ratio, preferably a 2:1 to 20:1 ratio.

Ammonium sulfamate: Mixed in a 1:1 to 100:1 ratio, preferably a 1:1 to 50:1 ratio.

Other organic herbicides 5,6-dihydro-(4A,6A)-dipyrido-(1,2-A,2',1'-C), pyrazinium dibromide: Mixed in a 1:20 to 16:1 ratio, preferably a 1:5 to 5:1 ratio.

3-amino-1,2,4-triazole: Mixed in a 1:20 to 20:1 ratio, preferably a 1:5 to 5:1 ratio.

3,6-endoxohexahydrophthalic acid: Mixed in a 1:3 to 20:1 ratio, preferably a 1:2 to 10:1 ratio.

Hexachloroacetone: Mixed in a 1:2 to 16:1 ratio, preferably a 1:1 to 8:1 ratio.

Diphenylacetonitrile, N,N - dimethyl - $\alpha,\alpha$ - diphenylacetamide, N,N - di - n - propyl - 2,6 - dinitro - 4 - trifluoromethylaniline, N,N - di - n - propyl - 2,6 - dinitro-4-methylaniline: Mixed in a 1:10 to 30:1 ratio, preferably a 1:5 to 20:1 ratio.

O - (2,4 - dichlorophenyl) - O - methyl - isopropylphosphoramidothiate, 2,3,5,6-tetrachloroterephthalic acid, dimethyl ester: Mixed in a 1:4 to 20:1 ratio, preferably a 1:3 to 15:1 ratio.

2,4 - dichloro - 4' - nitrodiphenyl ether: Mixed in a 1:10 to 30:1 ratio, preferably a 1:5 to 20:1 ratio.

1,1' - dimethyl - 4,4' - dipyridinium di(methylsulfate): Mixed in a 1:20 to 16:1 ratio, preferably a 1:5 to 5:1 ratio.

7 - oxabicyclo - [2.2.1]-heptane-2,3-dicarboxylic acid: Mixed in a 1:3 to 20:1 ratio, preferably a 1:2 to 10:1 ratio.

5,6 - dihydro - (9A,6A) - dipyrido - (1,2-A,2',1'-C) pyrazinium dibromide: Mixed in a 1:20 to 16:1 ratio, preferably a 1:5 to 5:1 ratio.

Substituted uracils

The crotonamides can also be combined with substituted uracils, in the proportions listed below. Methods for the preparation of the listed uracils which are novel can be found in Pats. Nos. 3,245,357, issued Feb. 15, 1966, and 3,235,360, issued Feb. 15, 1966.

5-bromo-3-isopropyl-6-methyluracil and salts
5-chloro-3-isopropyl-6-methyluracil and salts
5-bromo-3-sec-butyl-6-methyluracil and salts
3-sec-butyl-5-chloro-6-methyluracil and salts
5-bromo-3-cyclohexyl-6-methyluracil and salts
5-chloro-3-cyclohexyl-6-methyluracil and salts
5-bromo-3-tert-butyl-6-methyluracil
3-tert-butyl-5-chloro-6-methyluracil Mixed in a 1:4 to 4:1 ratio, preferably a 1:2 to 2:1 ratio.

3-cyclohexyl-6-methyluracil
3-cyclohexyl-6-ethyluracil
6-sec-butyl-3-cyclohexyluracil
3-cyclohexyl-6-propyluracil
3-cyclopentyl-6-methyluracil Mixed in a 1:4 to 4:1 ratio, preferably a 1:2 to 2:1 ratio.

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 ratio, preferably a 1:4 to 4:1 ratio.

5-bromo-3-cyclohexyluracil
5-chloro-3-cyclohexyluracil
5-bromo-3-isopropyluracil
5-bromo-3-sec-butyluracil
3-sec-butyl-5-chlorouracil Mixed in a 1:6 to 6:1 ratio, preferably a 1:2 to 2:1 ratio.

5-bromo-3-isopropyl-6-methyl-1-trichloromethylthiouracil
5-bromo-3-cyclohexyl-6-methyl-1-trichloromethylthiouracil
1-acetyl-5-bromo-3-sec-butyl-6-methyluracil
1-acetyl-5-bromo-3-isopropyl-6-methyluracil
5-chloro-3-isopropyl-6-methyl-1-trichloromethylthiouracil Mixed in a 1:4 to 4:1 ratio, preferably a 1:2 to 2:1 ratio.

In order that the invention be better understood, the following examples are given:

EXAMPLE 1

Preparation of ethyl[2-chloro-1-methyl-2-(phenylcarbamoyl)vinyl]carbamate*

A solution of 10 parts by weight of 2-chloroacetoacetanilide, 4.2 parts by weight of urethane, and 0.1 part by weight of p-toluene sulfonic acid in 40 parts by weight of benzene is heated under reflux overnight with continuous removal of water by means of a Dean-Stark trap. 0.6 part by weight of water is collected. The mixture is allowed to come to room temperature. Some triethylamine is added to neutralize the acid catalyst. The solvent is removed in vacuo and the residue recrystallized from an ethanol-water mixture yielding 10.5 parts by weight of product*, M.P. 75–79° C. This is a mixture of the cis- and trans-compounds.

*Analysis.*—Calc. for $C_{13}H_{15}ClN_2O_3$ (percent): C, 55.22; H, 5.35; Cl, 12.54; N, 9.91. Found (percent: C, 55.51; H, 5.29; Cl, 12.55; N, 10.03.

EXAMPLE 2

Preparation of ethyl[2-chloro-1-methyl-2-(o-fluorophenylcarbamoyl)vinyl]carbamate*

A solution of 30 parts by weight of 2-chloro-2'-fluoroacetoacetanilide, 11.6 parts by weight of urethane, and 0.1 part by weight of p-toluene sulfonic acid in 150 parts by weight of benzene is heated under reflux for 20 hours with continuous removal of water by means of a Dean-Stark trap. 2.3 parts by weight of water is collected. After a workup as described in Example 1, 20 parts by weight of product* is obtained, M.P. 96–98° C.

The following compounds are prepared as described in either Example 1 or 2, starting with the appropriate amounts of N-substituted or N,N-disubstituted 2-chloro- or fluoroacetoacetamide and a carbamate, a thiolcarbamate, or a substituted urea.

methyl [2-chloro-1-methyl-2-(o-fluorophenyl-carbamoyl) vinyl]carbamate
ethyl [2-chloro-1-methyl-2-(m-fluorophenylcarbamoyl) vinyl]carbamate
ethyl [2-chloro-1-methyl-2-(o-methoxyphenylcarbamoyl) vinyl]carbamate
ethyl [2-chloro-2-(3,4-dichlorophenylcarbamoyl)vinyl-1-methyl]carbamate
phenyl [2-chloro-1-methyl-2-(phenylcarbamoyl)vinyl] carbamate
o-fluorophenyl [2-chloro-1-methyl-2-(o-fluorophenyl-carbamoyl)vinyl]carbamate
m-fluorophenyl [2-chloro-1-methyl-2-(phenylcarbamoyl) vinyl]carbamate
butyl [2-chloro-1-methyl-2-(phenylcarbamoyl)vinyl] thiolcarbamate
p-bromophenyl [2-chloro-1-methyl-2-(m-trifluoromethyl-phenylcarbamoyl)vinyl]thiolcarbamate
ethyl [2-chloro-1-methyl-2-(N-methyl-N-phenyl-carbamoyl)vinyl]carbamate
butyl [2-chloro-1-methyl-2-(N-ethyl-N-phenyl-carbamoyl)vinyl]carbamate
phenyl [2-chloro-1-methyl-2-(N-ethyl-N-phenyl-carbamoyl)vinyl]thiolcarbamate
o-fluorophenyl [2-chloro-1-methyl-2-(N-methyl-N-o-ethylphenylcarbamoyl)vinyl]thiolcarbamate
methyl [2-fluoro-1-methyl-2-(phenylcarbamoyl)vinyl] carbamate
propyl [2-fluoro-1-methyl-2-(p-nitrophenylcarbamoyl) vinyl]carbamate
methyl [2-fluoro-1-methyl-2-(m-chlorophenylcarbamoyl) vinyl]thiolcarbamate
phenyl [2-fluoro-1-methyl-2-(phenylcarbamoyl)vinyl] carbamate
2-fluoro-2-(3-phenylureido)crotonanilide
2-fluoro-3-(2-o-fluorophenylureido)-2'-fluorocrotonanilide
2-fluoro-3-(3-o-fluorophenylureido)-3'-fluorocrotonanilide
2-fluoro-3-(3-m-ethoxyphenylureido)-N-methyl-N-phenylcrotonamide
ethyl [2-fluoro-3-(ethoxycarbonylamino)crotonoyl]-carbamate
phenyl [2-fluoro-3-(phenoxycarbonylamino)crotonoyl]-carbamate
phenyl [2-fluoro-3-(p-chlorophenoxycarbonylamino)-crotonoyl]-N-methylcarbamate
butyl N-allyl [2-fluoro-3-(butoxycarbonylamino)-crotonoyl]-carbamate

EXAMPLE 3

Preparation of ethyl trans-[2-chloro-1-methyl-2-(phenyl-carbamoyl)vinyl]carbamate*

7 parts by weight of ethyl [1-methyl-2-(phenylcarbamoyl)vinyl]carbamate is dissolved in 100 parts by weight of chloroform. 3.8 parts by weight of sulfuryl chloride in 40 parts by weight of chloroform is added dropwise with stirring at room temperature. The solvent is removed in vacuo and the residue recrystallized from an ethanol-water mixture to yield 4 parts by weight of product*, M.P. 96–98° C. This compound is pure, ethyl trans-[2-chloro-1-methyl-2-(phenylcarbamoyl)vinyl]carbamate.

Analysis.—Calc. for $C_{13}H_{15}ClN_2O_3$ (percent): C, 55.22; H, 5.35; Cl, 12.54; N, 9.91. Found (percent): C, 55.52; H, 5.49; Cl, 12.37; N, 9.92.

EXAMPLE 4

Preparation of ethyl [2-(butylcarbamoyl)-2-chloro-1-methylvinyl]carbamate 4.5 parts by weight of ethyl [2-(butylcarbamoyl)-1-methylvinyl]carbamate is dissolved in 16 parts by weight of benzene. 2.7 parts by weight of sulfuryl chloride in 8 parts by weight of benzene is added dropwise with stirring at room temperature. The solution is allowed to stand at room temperature for 30 mins. The solvent is evaporated in vacuo. A greenish oil is obtained.

EXAMPLE 5

Preparation of ethyl [2-chloro-3-(ethoxycarbonyl-amino) crotonoyl]carbamate*

6 parts by weight of ethyl [3-(ethoxycarbonylamino) crotonoyl]carbamate is dissolved in 40 parts by weight of benzene. 3.3 parts by weight of sulfuryl chloride in 8 parts by weight of benzene is added slowly with stirring at room temperature. The solution is allowed to stand at room temperature for 30 minutes. The solvent is then stripped in vacuo, and the residue recrystallized from an ethyl acetate-hexane mixture to yield 6 parts by weight of product*, M.P. 110–113° C.

EXAMPLE 6

Preparation of 2-chloro-3-(3-phenylureido)-croton-anilide*

2 parts by weight of 3-(3-phenylureido) crotonanilide is dissolved in 10 parts by weight of glacial acetic acid and 0.9 part by weight of sulfuryl chloride in 10 parts by weight of glacial acetic acid is added dropwise at room temperature with stirring. The solution is allowed to stand at room temperature for 30 minutes. Water is added and the suspension extracted with methylene chloride, washed with water and sodium bicarbonate solution and dried over anhydrous magnesium sulfate. The mixture is filtered and the solvent removed in vacuo to yield a pale yellow oil, which gives 0.5 part by weight of product* upon recrystallization from an ethanol-water mixture. The product* showed M.P. 150.5–153° C.

All of the compounds described following Examples 1 and 2, where X is not fluorine, may also be synthesized as described in Examples 3, 4, 5 and 6. In addition, the following compounds may be prepared in this way.

ethyl [2-chloro-1-methyl-2-(sec-butylcarbamoyl)vinyl]-carbamate
ethyl [2-chloro-1-methyl-2-(tert-butylcarbamoyl)vinyl]-carbamate
propyl [2-chloro-1-methyl-2-(phenylcarbamoyl)vinyl]-N-methylcarbamate
butyl [2-chloro-1-methyl-2-(o-fluorophenylcarbamoyl)-vinyl]-N-propylcarbamate
phenyl [2-chloro-3-(phenoxycarbonylamino)crotonoyl]-carbamate
methyl [2-chloro-3-(phenoxycarbonylamino)crotonoyl]-N-methyl carbamate
3-(3-o-fluorophenylureido)-2-chloro-2'-fluorocroton-anilide
3-(3-m-fluorophenylureido)-2-chloro-3'-fluorocroton-anilide
ethyl [2-chloro-1-methyl-2-(octylcarbamoyl)vinyl]-carbamate
methyl [2-chloro-1-methyl-2-(methylcarbamoyl)vinyl]-thiolcarbamate
phenyl[2-chloro-1-methyl-2-(cyclohexylcarbamoyl)-vinyl]-N-ethylcarbamate
o-fluorophenyl [2-chloro-1-methyl-2-(benzylcarbamoyl)-vinyl]-carbamate
propyl [2-chloro-1-methyl-2-(cyclopropylcarbamoyl)-vinyl]-thiolcarbamate tert-butyl [2-chloro-1-methyl-2-(cyclodecylcarbamoyl)-vinyl]-carbamate
sec-butyl [2-chloro-1-methyl-2-(2-cyclopentenylcarbamoyl)vinyl]-N-ethylcarbamate
isopropyl [2-chloro-1-methyl-2-(2-cyclodecenylcarbamoyl)vinyl]-carbamate
phenyl [2-chloro-1-methyl-2-(cyclohexylmethylcarbamoyl)vinyl]-thiolcarbamate
ethyl [2-chloro-3-(sec-butoxycarbonylamino)crotonoyl]-thiolcarbamate
methyl [2-chloro-3-(isopropoxycarbonylamino)-crotonoyl]-carbamate
phenyl [2-chloro-1-methyl-2-(2-cyclodecenylcarbamoyl)-vinyl]-carbamate
propyl (2-chloro-1-methyl-3-oxo-3-piperidinopropenyl)-carbamate
methyl (2-chloro-1-methyl-3-oxo-3-piperidinopropenyl)-carbamate

EXAMPLE 7

Preparation of ethyl [2-bromo-1-methyl-2-(phenylcarbamoyl)vinyl]carbamate*

12.4 parts by weight of ethyl [1-methyl-2-(phenylcarbamoyl)vinyl]carbamate are dissolved in 100 parts by weight of chloroform. 8.9 parts by weight of N-bromosuccinimide and 0.1 part by weight of benzoylperoxide is added and the resulting mixture stirred at room temperature for one hour. 3 parts by weight of succinimide is filtered, the solution is washed with water, dried over anhydrous magnesium sulfate and the solvent is removed in vacuo. The residue is recrystallized from an ethyl acetate-hexane mixture to yield 5 parts by weight of the product*, M.P. 75–78° C.

EXAMPLE 8

Preparation of ethyl[2-bromo-2-(sec-butylcarbamoyl)-1-methylvinyl]carbamate 11.4 parts by weight of ethyl[2-sec.-butylcarbamoyl)-1-methylvinyl]carbamate is dissolved in 200 parts by weight of chloroform. 8.9 parts by weight of N-bromosuccinimide and 0.1 part by weight of benzoylperoxide is added and the resulting mixture stirred for two hours at room temperature. The mixture is washed with water and the organic layer dried over anhydrous magnesium sulfate. The solvent is removed with a rotatory evaporator. A yellow oil is obtained.

The following compounds may be prepared as described in Examples 7 and 8.

propyl[2-bromo-1-methyl-2-(m-fluorophenylcarbamoyl)vinyl]carbamate
butyl[2-bromo-1-methyl-2-(o-fluorophenylcarbamoyl)vinyl]carbamate
2-bromo-3-(3-phenylureido)crotonanilide
ethyl[2-bromo-3-(ethoxycarbonylamino)crotonoyl]carbamate
ethyl[2-butylcarbamoyl-2-bromo-1-methylvinyl]carbamate
phenyl[2-bromo-1-methyl-2-(o-methoxyphenylcarbamoyl)vinyl]-N-methylcarbamate
methyl[2-bromo-1-methyl-2-(o-fluorophenylcarbamoyl)vinyl]thiolcarbamate
ethyl[2-bromo-2-(3,4-dichlorophenylcarbamoyl)vinyl-1-methyl]carbamate
2-bromo-3-(3-o-fluorophenylureido)-3'-fluorocrotonanilide
2-bromo-3-(3-p-bromophenylureido)crotonanilide
phenyl[2-bromo-3-(phenoxycarbonylamino)crotonyl]carbamate
phenyl[2-bromo-3-(m-chlorophenoxycarbonylamino)crotonoyl]thiolcarbamate
propyl[2-bromo-1-methyl-2-(cyclohexylcarbamoyl)vinyl]carbamate
isopropyl[2-bromo-1-methyl-2-(tert-butylcarbamoyl)vinyl]-N-methylcarbamate
butyl(2-bromo-1-methyl-3-oxo-3-hexamethyleneiminopropenyl)carbamate
sec-butyl(2-bromo-1-methyl-3-oxo-3-pyrrolidinopropenyl)carbamate

EXAMPLE 9

| | Percent |
|---|---|
| Mixture of cis- and trans-ethyl[2-chloro-1-methyl-2-(phenylcarbamoyl)vinyl]carbamate | 25.0 |
| Attapulgite clay | 68.5 |
| Finely divided synthetic silica | 4.0 |
| Dioctyl ester of sodium sulfosuccinate | 1.0 |
| Sodium lignin sulfonate | 1.5 |

The above components are blended in a ribbon blender mikropulverized in a hammer mill until the particles are under 50 microns in diameter and then reblended until homogeneous. All other compounds of this invention can be formulated in a similar manner.

This composition is useful for the control of annual and perennial vegetation growing along fire breaks. An application of 20 kg./hectare (active ingredient) gives excellent control of lambsquarter (*Chenopodium album*), seedling bindweed (*Convolvulus supp.*) plantain (*Plantago spp.*) crabgrass (*Digitaria spp.*) and bromegrass (*Bromus spp.*) and full panicum (*Panicum spp.*)

EXAMPLE 10

| | Percent |
|---|---|
| 2-chloro-3-(3-phenylureido)crotonanilide | 80.0 |
| Montmorillonite clay | 16.5 |
| Alkyl naphthalene sulfonic acid, no salt | 1.5 |
| Calcium lignin sulfonate | 2.0 |

The above compounds are blended, mikropulverized to a particle size essentially less than 50 microns and reblended.

The following compounds can be formulated in like manner.

2-bromo-3-(3-phenylureido)crotonanilide
ethyl[2-chloro-3-(ethoxycarbonylamino)crotonyl]carbamate
ethyl[2-bromo-3-(ethoxycarbonylamino)crotonyl]carbamate This formulation is applied in 200 l./ha. of water at the rate of 2 kg. (active) per hectare to a field of asparagus before the spears emerge in the spring. It gives control of crabgrass, chickweed (*Stellaria media*) goosegrass (*Eleusine indica*), and seedling Johnsongrass.

EXAMPLE 11

| | Percent |
|---|---|
| Methyl[2 - chloro - 1 - methyl - 2 - (o - fluorophenylcarbamoyl)-vinyl]carbamate | 10.0 |
| Attapulgite clay | 30.0 |
| Sodium alkyl benzene sulfonate | 0.5 |
| Talc | 59.5 |

The acive component is blended with the minor diluent and the surfactant and this composition is mikropulverized to a particle size less than 100 microns. The final dust formulation is then prepared by blending the ground portion with the talc.

The following compounds can be formulated in like manner.

propyl[2-bromo-1-methyl-2-(m-fluorophenylcarbamoyl)vinyl]carbamate
ethyl[2-chloro-1-methyl-2-(m-fluorophenylcarbamoyl)vinyl]carbamate This formulation is utilized at 1 to 2 kg./hectare of active ingredient in 200 liters of water for preemergence control of annual weeds in sugar cane (but postemergence to the crop). A directed spray gives good crabgrass, goosegrass, (*Eleusine indica*), barnyardgrass (*Echinochloa crusgalli*), jimson weed (*Datura stramonium*) and lambsquarters (*Chenopodium album*).

EXAMPLE 12

| | Percent |
|---|---|
| 2-chloro-3-(3-phenylureido)crotonanilide | 25.0 |
| Calcium lignin sulfonate plus wood sugars | 15.0 |
| Hydrated attapulgite | 2.0 |
| Disodium hydrogen phosphate | 1.0 |
| Sodium pentachlorophenate | 0.5 |
| Water | 56.5 |

All the above ingredients except the water are blended and mikropulverized. The water is then added and the composition is sand-ground to a particle size essentially less than 5 microns.

2-bromo-3-(3-phenylureido)crotoanilide can be formulated in a similar manner. The composition may be dispersed in water at the rate of 4 kg. of active ingredient in 400 l. of water and applied as a directed spray on young pineapple for the control of weeds. Such plants as crabgrass, barnyardgrass, lambquarters and Johnsongrass seedlings are controlled.

EXAMPLE 13

| | Percent |
|---|---|
| 2-chloro-3-(3-phenylureido)crotonanilide | 25.0 |
| Diesel oil | 65.0 |
| Polyoxyethylene sorbitan ester of mixed rosin and fatty acids | 10.0 |

The above ingredients are ground in a ball mill until the solids are finely dispersed in the oil and the average particle size of the active ingredient is less than 5 microns.

This formulation is diluted with Lion Herbicidal oil No. 6 and applied at a volume of 1000 l./hectare and 10 to 20 kg./ha. of crotonamide per hectare to a railroad right-of-way and yards. The treatment provides good initial kill and residual control of such vegetation as quackgrass (Agropyron repens), crabgrass, Bermudagrass (Cynodon dactylon), bromegrass, ragweed, cocklebur (Xanthium spp.) and plantain.

EXAMPLE 14

| | Percent |
|---|---|
| Trans-ethyl[2 - chloro - 1 - methyl - 2 - (phenylcarbamoyl)-vinyl]carbamate | 20.0 |
| Calcium lignin sulfonate plus wood sugars | 15.0 |
| Anhydrous sodium sulfate | 10.0 |
| Kaolinite | 28.0 |
| Calcium/magnesium sub-bentonite | 27.0 |

The above components are blended and mikropulverized to pass an 0.42 mm. screen. This composition is mixed with 15–20% of water and extruded under pressure through an orifice to produce rods which are then cut into pellets and dried. The pellets may be further subdivided into granules if desired by passing them through a Stokes granulator.

The pellets may be placed at the base of clumps of black willow, red maple and oak at the rate of 2 tablespoonfuls per inch of trunk diameter to control these woody plants.

EXAMPLE 15

| | Percent |
|---|---|
| Ethyl[2 - butylcarbamoyl) - 2 - chloro - 1 - methyl-vinyl]carbamate | 10.0 |
| Trimethylnonyl polyethylene glycol ether | 1.0 |
| Heavy aromatic naphtha | 5.0 |
| Granular attapulgite (16–30 mesh, i.e. 1.2–0.6 mm.) | 84.0 |

The above components, except the attapulgite, are mixed to form a homogeneous solution which is sprayed on the granules while being tumbled in a blender. After the spraying is complete, the granules are suitable for application without further treatment.

Ethyl[2 - butylcarbamoyl) - 2 - bromo - 1 - methyl-vinyl]carbamate can be formulated in like manner.

These granules are applied in the spring with a spreader at a rate to give 30 kg./hectare of active ingredient in a lumber yard. This treatment provides control of crabgrass, barnyardgrass, ragweed, carolina crancsbill (Geranium carolinianum) and flower-of-an-hour (Hibiscus trionum).

EXAMPLE 16

| | Percent |
|---|---|
| Ethyl[2 - bromo - 1 - methyl - 2 - (phenylcarbamoyl)-vinyl]carbamate | 10.0 |
| 6–15 mesh (3.35–1.25 mm.) expanded vermiculite | 90.0 |

The above granular formulation is made by dissolving the active ingredient in methylene chloride, spraying it on the vermiculite, and then drying the product.

The above granular material is applied around highway guard rails by hand at the rate of 15 kg./hectare of active ingredient. The treatment controls the vegetation growing around the guard rails, such as bluegrass (Poa pratensis), meadow fescue (Fescue elatior), wild carrot (Daucus carota) and bromegrass (Bromus inermis), very effectively.

EXAMPLE 17

| | Percent |
|---|---|
| Ethyl[2 - butylcarbamoyl) - 2 - chloro - 1 - methyl-vinyl]carbamate | 35.0 |
| Heavy aromatic naphtha | 55.0 |
| Blend of oil-soluble calcium sulfonates and alkyl phenyl polyethylene glycol ethers | 10.0 |

The above ingredients are blended to form a homogeneous, emulsifiable solution.

An emulsion containing 25 kg. of the above active ingredient in 500 l. of water is prepared. This is sprayed over a hectare of railway yard. Control of annual bluegrass (Poa annua), chickweed (Stellaria media), henbit (Lamium amplexicaule) and black mustard (Brassica nigra) are obtained.

EXAMPLE 18

| | Percent |
|---|---|
| Ethyl[2 - butylcarbamoyl) - 2 - bromo - 1 - methyl-vinyl]carbamate | 25.0 |
| Aromatic weed oil | 75.0 |

The above ingredients are blended to form an oil concentrate suitable for aerial application or for further dilution prior to ground spraying.

The above formulation is applied at the rate of 500 l./hectare to a fine break with a helicopter. The treatment gives control of such annual and perennial vegetation, wild mustard, quackgrass, crabgrass, burdock, and healall (Prunella vulgaris).

EXAMPLE 19

| | Percent |
|---|---|
| Trans-ethyl[2 - chloro - 1 - methyl - 2 - (phenylcarbamoyl)vinyl]carbamate | 95.0 |
| Trimethylnonyl polyethylene glycol ether | 1.0 |
| Finely divided synthetic silica | 4.0 |

The above ingredients are blended and mikropulverized to pass an 0.42 mm. screen followed by reblending. This high strength composition is suitable for further formulation or it can be suspended in water with efficient agitation acid sprayed through a coarse nozzle.

This formulation may be used in large volume of water to spot treat around farm buildings if the spray tank is well agitated. Rates as high as 80 kg./ha. may be used. Peppergrass (Lepidium virginicum) crabgrass, bluegrass, and burdock are effectively controlled.

EXAMPLE 20

| | Percent |
|---|---|
| Ethyl[2 - chloro - 3 - (ethoxycarbonylamino)crotonyl]carbamate | 25.0 |
| Anhydrous sodium metasilicate | 37.0 |
| Anhydrous potassium carbonate | 37.5 |
| Sodium dioctylsulfosuccinate | 0.5 |

The above components are blended, mikropulverized and reblended. Upon addition to water at spray concentration, the alkaline environment solubilizes the active compound and a homogeneous solution is formed.

Five kilograms active ingredient as the above formulation are emulsified in 400 l. of water and applied as a directed spray to control weeds in young pineapples. Such weeds as crabgrass, perennial foxtail seedlings (*Setaria geniculata*) and seedling American burnweed (*Erechtites hieracifolia*) are controlled.

EXAMPLE 21

|  | Percent |
|---|---|
| Ethyl[2 - butylcarbamoyl) - 2 - chloro - 1 - methylvinyl]carbamate | 20.0 |
| Trimethylnonyl polyethylene glycol ether | 40.0 |
| Aromatic weed oil | 40.0 |

The above high-surfactant composition is prepared by blending the individual components.

Ethyl[2 - (butylcarbamoyl) - 2 - bromo - 1 - methylvinyl]carbamate can be formulated similarly.

This high surfactant formulation may be used as a spot treatment for the postemergence control of young nutsedge (Cyperus spp.) in cotton fields. Ten kilograms (active) may be emulsified in 100 liters of water and this used to spot spray infested areas using a knapsack sprayer.

Utility

The chemicals of this invention may be used to control the growth of plants. More specifically, these crotonamides comprise a new class of chemicals which may be utilized to kill all vegetation and to keep the treated area free of plant growth. By the proper selection of chemical, rate, method of application, and crop, it is possible to use the crotonamides for selective weed control. Such crops as sugar cane, asparagus, and pineapple are suitable.

The precise rates used will very according to the result desired, the plants to be controlled, the season, rainfall, and other factors. In general, rates of ½ to 80 kg./hectare will be used. For complete control of all vegetation, the higher rates will be used, while for selective weed control lower rates may be required, normally such rates would be between ¼ and 10 kg./hectare. The exact rate for a particular situation may be selected by one skilled in the art.

What is claimed is:

1. A herbicidal composition comprising an inert diluent and a herbicidally effective amount of a compound of the formula $$R_1-O-\overset{O}{\overset{\|}{C}}-\overset{R}{\overset{|}{N}}-\overset{CH_3}{\overset{|}{C}}=\overset{}{\underset{X}{C}}-\overset{O}{\overset{\|}{C}}-N\overset{R_2}{\underset{R_3}{\diagdown}}$$

where

X is chlorine, bromine or fluorine;
R is hydrogen, alkyl of 1 to 4 carbon atoms or allyl;
$R_1$ is alkyl of 1 through 4 carbon atoms;
$R_2$ is phenyl, benzyl, chlorophenyl, bromophenyl, alkoxyphenyl, dichlorophenyl, dibromophenyl, fluorophenyl, trichlorophenyl, alkylphenyl of 7 through 11 carbon atoms, dialkyl phenyl of 8 through 12 carbon atoms, nitrochlorophenyl, nitrophenyl, dichloronitrophenyl, chloroalkoxyphenyl of 7 through 11 carbon atoms, trifluoromethylphenyl, chlorobenzyl, dichlorobenzyl, nitrobenzyl, or alkoxybenzyl of 8 through 11 carbon atoms; and
$R_3$ is hydrogen, methyl or ethyl.

2. A method for controlling undesirable vegetation which comprises applying to the locus to be protected a herbicidally effective amount of a compound of the formula $$R_1-O-\overset{O}{\overset{\|}{C}}-\overset{R}{\overset{|}{N}}-\overset{CH_3}{\overset{|}{C}}=\overset{}{\underset{X}{C}}-\overset{O}{\overset{\|}{C}}-N\overset{R_2}{\underset{R_3}{\diagdown}}$$

where

X is chlorine, bromine or fluorine;
R is hydrogen, alkyl of 1 to 4 carbon atoms or allyl;
$R_1$ is alkyl of 1 through 4 carbon atoms;
$R_2$ is phenyl, benzyl, chlorophenyl, bromophenyl, alkoxyphenyl, dichlorophenyl, dibromophenyl, fluorophenyl, trichlorophenyl, alkylphenyl of 7 through 11 carbon atoms, dialkylphenyl of 8 through 12 carbon atoms, nitrochlorophenyl, nitrophenyl, dichloronitrophenyl, chloroalkoxyphenyl of 7 through 11 carbon atoms, trifluoromethylphenyl, chlorobenzyl, dichlorobenzyl, nitrobenzyl, or alkoxybenzyl of 8 through 11 carbon atoms; and
$R_3$ is hydrogen, methyl or ethyl.

3. A composition of claim 1 wherein X is chlorine or bromine; each of R and $R_3$ is hydrogen; and $R_1$ is methyl or ethyl.

4. A herbicidal composition as defined in claim 3 where said herbicidally effective compound is ethyl[2-chloro-1-methyl-2-(phenylcarbamoyl)vinyl]carbamate.

5. A method of claim 2 wherein X in the formula of the herbicidal compound is chlorine or bromine; each of R and $R_3$ is hydrogen; and $R_1$ is methyl or ethyl.

6. A method as defined in claim 5 where said compound is ethyl [2 - chloro-1-methyl-2-(phenylcarbamoyl)vinyl] carbamate.

References Cited

UNITED STATES PATENTS

| 3,326,659 | 6/1967 | Schwartz | 71—111 |
| 3,476,490 | 11/1969 | Fest et al. | 71—111 |
| 3,525,765 | 8/1970 | Fancher et al. | 71—111 X |
| 3,321,464 | 5/1967 | Soboczenski | 71—92 X |

JAMES O. THOMAS, JR., Primary Examiner

U.S. Cl. X.R.

71—84, 88, 92, 93, 94, 100, 106 119, 120; 260—241, 294, 294.3 326.3, 455 A, 468, 471, 479 C, 553